UNITED STATES PATENT OFFICE.

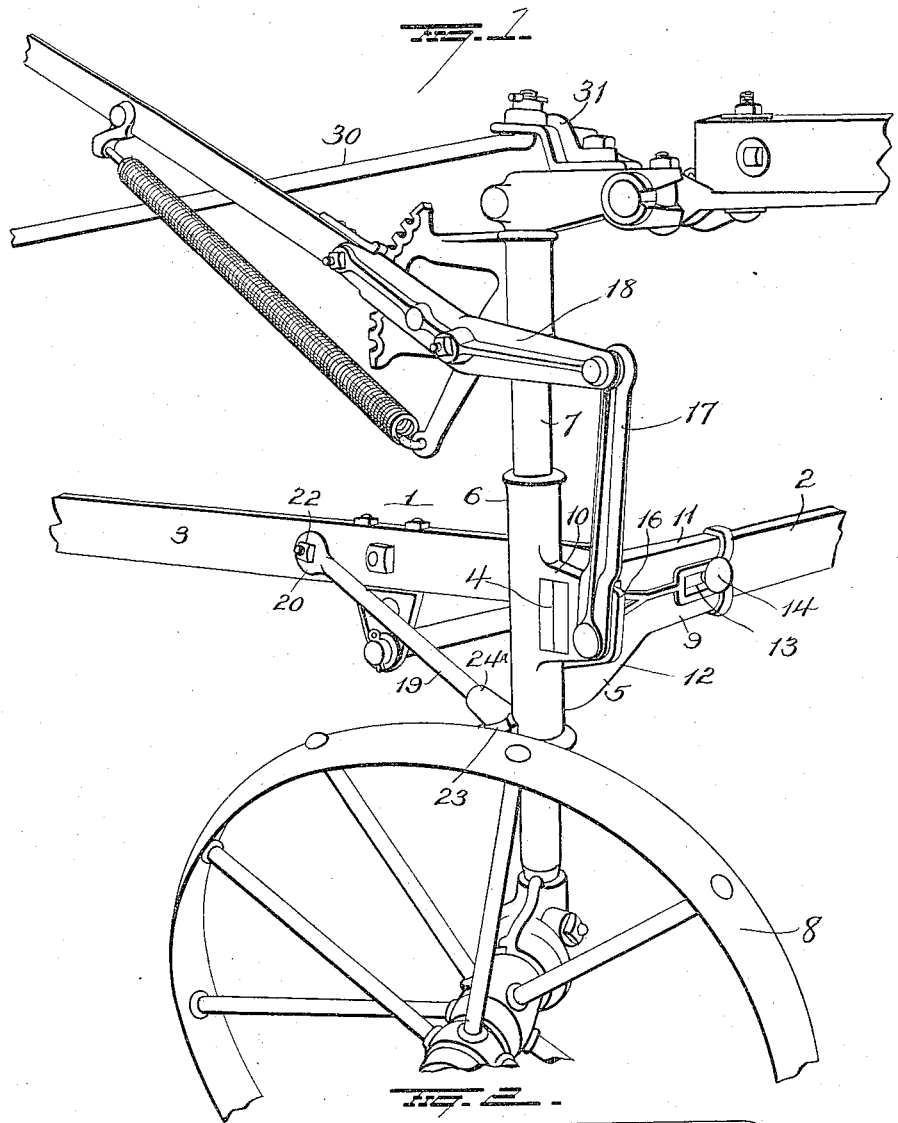
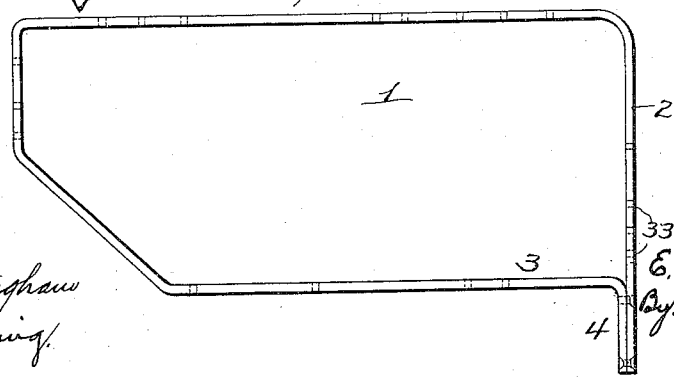

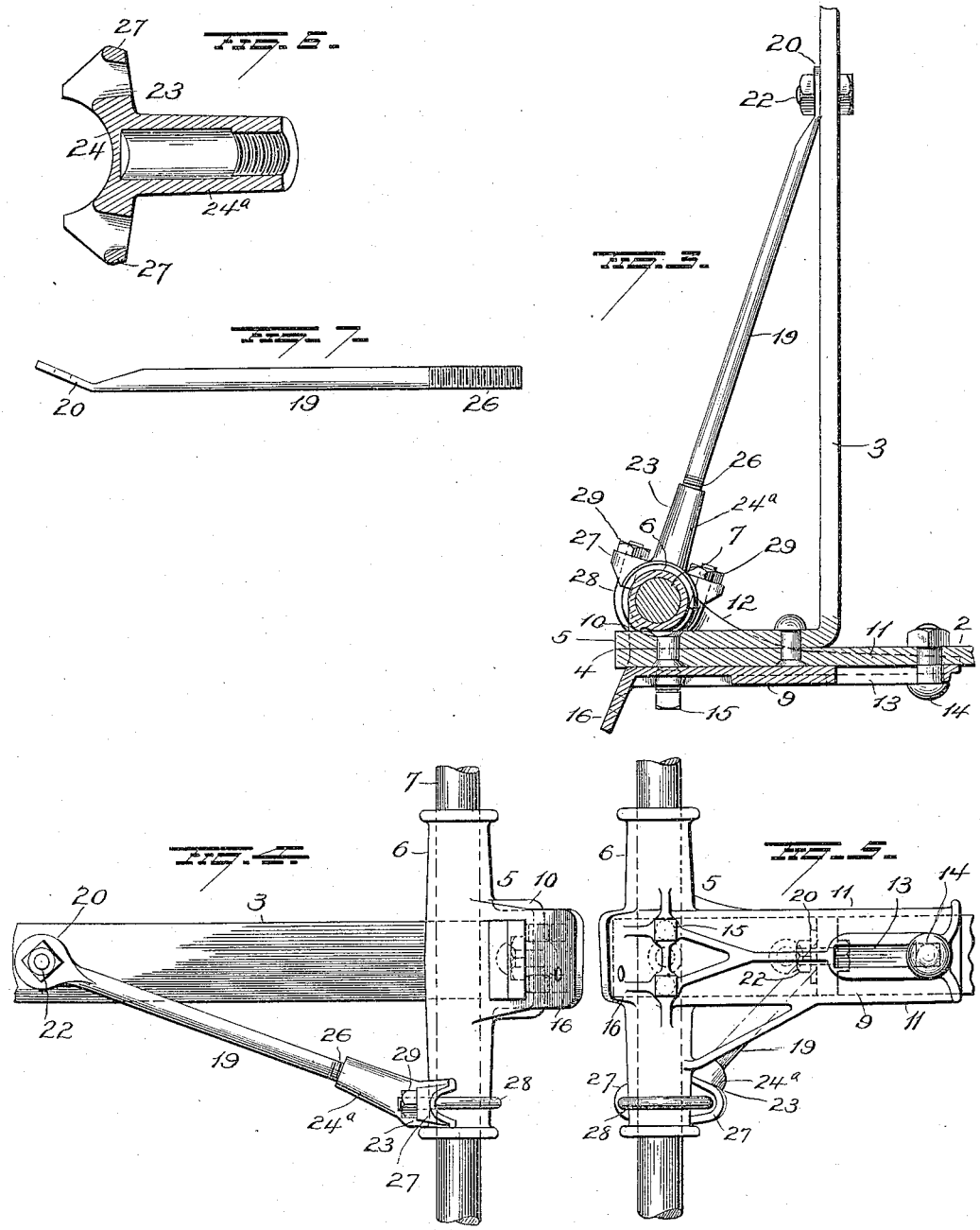

EDWARD M. HEYLMAN, OF SOUTH BEND, INDIANA, ASSIGNOR TO OLIVER CHILLED PLOW WORKS, OF SOUTH BEND, INDIANA.

WHEELED PLOW.

1,168,208.  Specification of Letters Patent.  Patented Jan. 11, 1916.

Application filed April 30, 1915. Serial No. 24,979.

*To all whom it may concern:*

Be it known that I, EDWARD M. HEYLMAN, a citizen of the United States, and a resident of South Bend, in the county of St. Joseph and State of Indiana, have invented certain new and useful Improvements in Wheeled Plows; and I do hereby declare the following to be a full, clear, and exact description of the invention, such as will enable others skilled in the art to which it appertains to make and use the same.

This invention relates to wheeled plows, and more particularly to improvements upon the type of plow illustrated in patent granted to C. R. Davis, September 5th, 1899, No. 632,647,—the present invention being applicable as well to a sulky as to a gang plow.

Heretofore, difficulty has been experienced in providing a bracket for the front furrow wheel axle, which would be capable of sufficient adjustment on the frame to accommodate different widths of cut, and which would have adequate bearing on the frame to prevent the front wheel axle from sagging out at the bottom when side strain is brought to bear on the wheel to gage the width of the furrow.

One object of my invention is to overcome the deficiencies heretofore encountered and to so construct an improved bracket and plow frame, that said bracket may be adjustably secured to the forward end of the frame in such manner as to be capable of withstanding the strains to which it may be subjected.

A further object is to so construct the bearing bracket for the axle of the front furrow wheel, that it may have an extended bearing on the plow frame and be capable of adjustment thereon, transversely of the frame, without sacrificing strength and efficiency.

With these and other objects in view, the invention consists in certain novel features of construction and combinations of parts as hereinafter set forth and pointed out in the claims.

In the accompanying drawings, Figure 1 is a view showing the application of my improvements; Fig. 2 is a plan view of the plow frame; Fig. 3 is a horizontal sectional view through one corner of the frame and the furrow-wheel-axle bracket; Fig. 4 is a side elevation showing the axle bracket and its connections with the side bar of the frame; Fig. 5 is a front view showing the axle bracket; Fig. 6 is a sectional view of the anchoring member 23, and Fig. 7 is a detail view of the brace 19.

1 represents a plow frame which has a general rectangular shape and may be made in a single piece. The front end bar 2 of the frame projects laterally beyond the side bar 3 of the frame, and the forward end of said side bar is bent laterally and securely fastened to the laterally projecting portion of the front bar 2, said laterally projecting portions of the front bars forming a lateral arm 4 at the forward right-hand corner of the frame. To this lateral arm and to the front frame bar, my improved axle bracket 5, is secured.

The bracket 5 comprises an approximately vertical tubular portion 6 for the accommodation of the upright axle 7 of the forward furrow wheel 8; a horizontal arm 9 and a loop-portion 10 integral with the tubular portion, or bearing sleeve 6 and the arm 9 and connecting the same.

The arm 9 of the bracket arm is disposed against the outer face of frame arm 4 and is of sufficient length to extend an appreciable distance over the front face of the front frame bar 2,—the intermediate loop portion 10 serving to receive the end portion of the frame arm 4, so that the upright tubular member or bearing sleeve 6 will be disposed rearwardly of the frame arm 4. The bracket arm 9 is provided at its upper and lower edges with flanges 11 which engage the upper and lower edges of the front frame bar 2 and arm 4, and a strengthening web 12 is provided in the angle formed by the arm 9 and the lower portion of the bearing sleeve or tubular upright member 6. By the provision of the flanges 11 which embrace the front frame bar, the lower end of the bracket will be prevented from crowding out when plowing and from crowding in when turning corners. The bracket arm 9 is made with an elongated slot 13 for the passage of a bolt 14, the latter passing also through the front frame bar 2. Set screws 15 pass through suitably threaded holes near the outer end of bracket arm 9 and engage the outer face of the frame arm 4 of the lateral arm 4, whereby the bracket 5 will be clamped near one end to said lateral arm of the frame. The bracket 5 is also provided at the juncture of the portions 9 and 10 thereof, with a lateral and forward projection or extension 16 to which the lower end of a link 17 is pivoted, the upper end of said link being connected with an operating lever 18. The particular construction and manner of mounting this lever do not constitute features of my present invention as defined by the claims, and hence a detail description herein would be superfluous.

The lower portion of the bracket is connected with the side frame bar 3, by means of an adjustable brace 19. The rear end of this brace is made with a thin portion 20 which is capable of being bent to cause it to properly lie flat against the frame bar 3 (when the bracket is adjusted from one position to another, as explained) and the end portion 20 of the brace is perforated for the passage of a bolt 22, whereby it is attached to the frame bar 3. The brace 19 is connected with the lower end of the upright tubular portion 6 of the bracket 5, through the medium of an anchoring member 23, having a curved seat portion 24 to engage the tubular member 6 of the bracket. The member 23 is also made with a tubular extension 24ᵃ, the outer portion of which is internally threaded for the accommodation of the threaded forward end 26 of the brace 19. The member 23 is made above and below the tubular extension 24ᵃ, with perforated lugs 27 for the accommodation of the ends of a U-bolt 28. The latter embraces the lower portion of the upright tubular member 6 of the bracket 5 and serves to secure the anchoring member 23 to the latter,—the ends of the U-bolt being threaded to receive nuts 29 seated against the lugs 27.

With the use of my improvements, the bearing bracket 5 for the axle of the front furrow wheel is located at the front end of the plow frame and connected thereto in such manner that it may be readily adjusted to accommodate different widths of cut, and the brace will operate to relieve the frame from torsional strains.

It will be observed by reference to Fig. 1, that the upper end of the upright axle of the front furrow wheel inclines slightly to the rear. When the plow is at work, the draft will tend to carry the lower end of the axle to the rear and the side pressure on the rear caster wheel (not shown) through the connecting rod 30 with the arm 31 on the front furrow wheel axle, has a tendency to push the upper end of the latter in a forward direction, and this will cause the front axle to assume almost an exact vertical position when the plow is at work. It will be apparent that by the use of the brace 19, twisting strains on the frame bars under the conditions above described will be obviated.

By attaching the bracket 5 for the front furrow wheel axle to the front side of the forward frame bar and causing it to extend laterally beyond the side frame bar, a long bearing for said bracket on the frame is afforded, which would not be possible if the bracket were attached to the rear side of the frame arm.

By loosening the bolt 14 and set screws 15 and removing the bolt 22 at the rear end of the brace 19 and loosening the nuts 29 on the U-bolt 28, the bracket may be adjusted on the frame to the limit of the slot 13. When my improvements are employed on a sulky plow, (the frame arm of which is of greater length relatively to the frame than the frame arm on the frame of the gang plow), several holes, as indicated at 33, Fig. 2, may be employed to provide for lateral adjustment of the front furrow wheel axle bracket, and the elongated slot 13 in the bracket arm may also be employed to effect nicety of adjustment and for taking up wear. Thus the bracket, when employed on a sulky plow employing a single plow body, may be adjusted to accommodate plow bodies of different sizes.

It is apparent that when the bearing bracket is adjusted outwardly or inwardly, the brace 19 may be lengthened or shortened through the medium of its threaded connection with the anchoring member 23, and the latter will adapt itself to proper position relatively to the tubular upright portion 6 of the bracket, when the rear end of the brace is secured to the side frame bar. The bracket having been adjusted, the operator will tighten the nuts and the bracket will then be rigidly secured to the forward end of the plow frame and to the lateral arm of said frame.

Slight changes might be made in the details of construction of my invention without departing from the spirit thereof or limiting its scope and hence I do not wish to restrict myself to the precise details herein set forth.

Having fully described my invention what I claim as new and desire to secure by Letters-Patent, is:—

1. In a plow structure, the combination with a frame having a laterally projecting frame arm at its forward end, of a bearing bracket for the front furrow wheel axle adjustably secured to the front end of the frame and to said lateral frame arm with the vertical portion through which the axle passes disposed behind the lateral framearm, and an adjustable brace connecting said bracket with the side of said frame.

2. In a plow structure, the combination with a frame having a front arm projecting laterally therefrom, of a bracket for the front furrow wheel axle adjustably secured to the front end of the frame and mounted on said lateral arm, and set screws passing through said bracket and engaging the lateral frame arm, whereby the bracket will be clamped to the latter.

3. In a plow structure, the combination with a horizontal frame having side and front bars and a laterally projecting arm at the juncture of the front and one side bar, of a bearing bracket for the front furrow wheel axle, secured to said lateral arm and to the forward bar of said frame, means permitting lateral adjustment of said bracket relatively to the frame, and an adjustable brace connecting the lower portion of the bearing bracket with a side bar of the frame.

4. In a plow structure, the combination with a horizontal frame having a lateral frame arm at its forward end, of a bearing bracket for a front furrow wheel axle, said bracket comprising a slotted arm adjustably secured to the front bar of the frame, an upright tubular member to receive said axle, and an intermediate loop portion for the passage of said lateral frame arm.

In testimony whereof, I have signed this specification in the presence of two subscribing witnesses.

EDWARD M. HEYLMAN.

Witnesses:
EDWIN NICAR,
KATE E. BUCKLEY.

Copies of this patent may be obtained for five cents each, by addressing the "Commissioner of Patents, Washington, D. C."